United States Patent [19]

Ide et al.

[11] Patent Number: 4,612,828

[45] Date of Patent: Sep. 23, 1986

[54] CONTROL SYSTEM FOR AN INFINITELY VARIABLE TRANSMISSION

[75] Inventors: Tohru Ide, Hoya; Minoru Okamura, Tokyo, both of Japan

[73] Assignee: Fuji Jukogyo Kabushiki Kaisha, Tokyo, Japan

[21] Appl. No.: 723,678

[22] Filed: Apr. 16, 1985

[30] Foreign Application Priority Data

Apr. 20, 1984 [JP] Japan .................................. 59-80853

[51] Int. Cl.⁴ ............................................. B60K 41/16
[52] U.S. Cl. ........................................ 74/866; 74/861; 74/867; 74/868; 74/877
[58] Field of Search .................. 74/856, 861, 865, 866, 74/867, 868, 877; 474/28

[56] References Cited

U.S. PATENT DOCUMENTS

| | | | |
|---|---|---|---|
| 4,161,894 | 7/1979 | Giacosa | 74/863 |
| 4,369,675 | 1/1983 | van Deursen | 74/868 X |
| 4,387,608 | 6/1983 | Mohl et al. | 74/866 |
| 4,400,164 | 8/1983 | Cadee | 74/867 X |
| 4,467,674 | 8/1984 | van Deursen et al. | 74/867 |
| 4,500,301 | 2/1985 | Cadee | 474/28 |
| 4,515,040 | 5/1985 | Takeuchi et al. | 74/866 |
| 4,536,171 | 8/1985 | Tanaka et al. | 474/28 |
| 4,547,178 | 10/1985 | Hayakawa et al. | 74/867 X |

FOREIGN PATENT DOCUMENTS

| | | | |
|---|---|---|---|
| 63786 | 11/1982 | European Pat. Off. | 74/865 |
| 54-157930 | 12/1979 | Japan | |
| 57-33255 | 2/1982 | Japan | |

Primary Examiner—Kenneth J. Dorner
Assistant Examiner—Dwight G. Diehl
Attorney, Agent, or Firm—Martin A. Farber

[57] ABSTRACT

An infinitely variable belt-drive transmission is provide with a D/L-range as one of operating ranges. The system has a transmission ratio control valve comprising a spool which is moved in the downshift direction to downshift the transmission and in the upshift direction opposite to the downshift direction to upshift the transmission. An actuator is provided for moving the spool. When an accelerator pedal of a motor vehicle is depressed at the D/L-range, the actuator operates to move the spool in the downshift direction and when the accelerator pedal is released at the D/L-range, the actuator operates to move the spool in the upshift direction.

3 Claims, 5 Drawing Figures

4,612,828

CONTROL SYSTEM FOR AN INFINITELY VARIABLE TRANSMISSION

BACKGROUND OF THE INVENTION

The present invention relates to a system for controlling the transmission ratio of an infinitely variable belt-drive transmission for a vehicle, and more particularly to a control system in which low (L) range and drive (D) range can be automatically selected in accordance with the depression of an accelerator pedal of the vehicle.

Japanese Patent Laid-open No. 57-33255 discloses a control system of this type, in which operation range of an infinitely variable belt-drive transmission, such as parking (P-range), reverse (R-range), neutral (N-range), drive (D-range) and low (L-range), can be selected by the actuation of a shift lever like an ordinary automatic transmission device. In the D-range, transmission ratio is controlled throughout the whole area from the highest transmission ratio to the lowest ratio, and in the L-range, the transmission is downshifted to a higher ratio. Thus, when the L-range is selected, engine speed is quickly increased by depressing an accelerator pedal. However, releasing the accelerator pedal in the L-range apts to cause very high engine braking effect. Therefore, it is desirable to shift the shift lever quickly to the D-range before releasing the accelerator pedal after the acceleration at the L-range. Such quick operation of the shift lever may be difficult for the driver, especially for beginners.

On the other hand in the infinitely variable belt-drive transmission, the smaller the throttle valve opening degree is, the higher the transmission ratio is provided. Accordingly, if the accelerator pedal is depressed at the D-range, a large downshifting for rapid acceleration can not be effected. Further, because of the construction of the infinitely variable belt-drive transmission, the friction torque between a belt and pulleys becomes larger as the transmission is downshifted. Consequently, the response to the demand for rapid acceleration is low at the D-range.

SUMMARY OF THE INVENTION

The object of the present invention is to provide a control system in which transmission ratio is changed to have a transmission characteristic of L-range when the accelerator pedal is depressed at the D-range, so that acceleration operability is improved.

To this end, there is provided a D/L-range as one of operating ranges in an infinitely variable transmission, in addition to the D-range and L-range. In the D/L-range, either of transmission characteristics of D-range and L-range can be selected automatically according to whether the accelerator pedal is depressed or not.

According to the present invention, there is provided a control system for an infinitely variable transmission for a vehicle powered by an internal combustion engine, the transmission having a shift lever for selecting operating ranges including a D/L-range, an infinitely variable power transmitting device, a hydraulic circuit for operating the power transmitting device, first detecting means for producing a first signal dependent on engine speed a transmission ratio control valve provided in the hydraulic circuit and having a spool responsive to the first signal for controlling the transmission ratio of the power transmitting device.

The system comprises first means for forcibly shifting the spool of the transmission ratio control valve in the downshift direction, second detecting means responsive to operation of an accelerator pedal of the vehicle for producing a second signal, a D/L-range switch for producing a third signal when the range is selected by the shift lever, second means responsive to the second and third signals for operating the first means, the second means being arranged to operate the first means to move the spool in the downshift direction in response to the second signal at the depression of the accelerator pedal, and to move the spool in the upshift direction opposite to the downshift direction in response to the second signal at the release of the accelerator pedal.

In an aspect of the present invention, the infinitely variable power transmission device is a belt-drive device comprising a drive pulley having a hydraulically shiftable disc, a driven pulley having a hydraulically shiftable disc and a hydraulic cylinder for operating the disc, and a belt engaged with both pulleys, the hydraulic circuit has a pump for supplying oil, and the transmission ratio control valve is responsive to the first signal for controlling the oil and for shifting the disc of the drive pulley to change the transmission ratio.

The other objects and features of this invention will be apparently understood from the following description with reference to the accompanying drawings.

DETAILED DESCRIPTION OF THE PREFERRED EMBODIMENT

Figure 1:
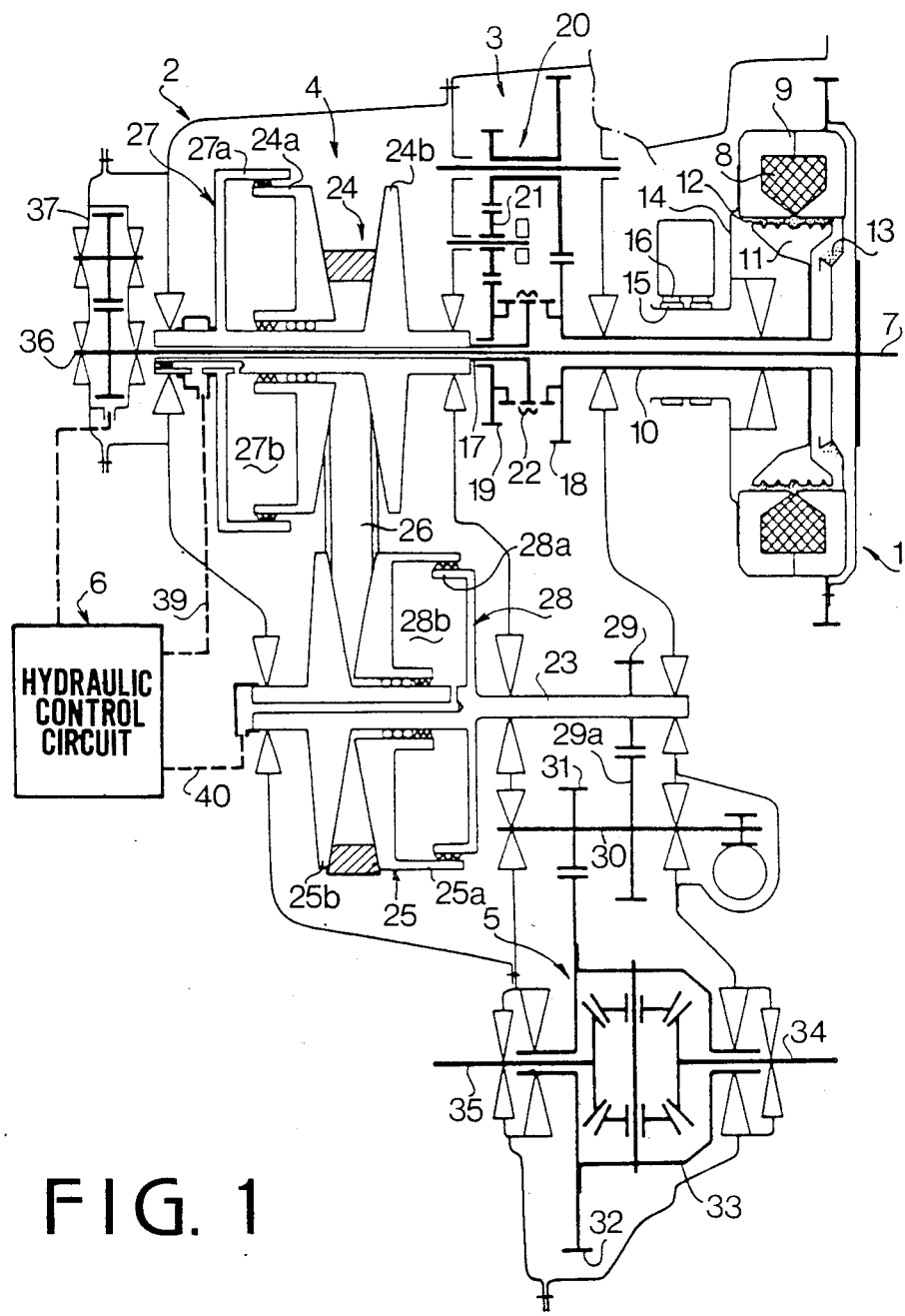
FIG. 1 is a schematic illustration of an infinitely variable belt-drive transmission to which the present invention is applied.

Referring to FIG. 1, an infinitely variable belt-drive automatic transmission for a motor vehicle to which the present invention is applied, comprises an electromagnetic powder clutch 1, and an infinitely variable belt-drive transmission 2. The transmission comprises a selector device 3, a belt-drive device 4, a final reduction device 5, and a hydraulic control circuit 6. A crankshaft 7 of an engine (not shown) is connected to an annular drive member 9 of the electromagnetic powder clutch 1. The electromagnetic powder clutch comprises a magnetizing coil 8 provided in the drive member 9, a driven member 11 having its outer periphery spaced from the inner periphery of the drive member 9 by a gap, and a powder chamber 13 defined between the drive member 9 and driven member 11. The driven member 11 is secured to an input shaft 10 of the belt-drive transmission 2. The coil 8 is supplied through brushes 16 and slip rings 15 with control current from a electronic control circuit.

When the magnetizing coil 8 is excited by clutch current, drive member 9 is magnetized to produce a magnetic flux passing through the driven member 11. The magnetic powder in the powder chamber 13 is aggregated in the gap by the magnetic flux and the driven member 11 is engaged with the drive member 9 by the powder.

The selector device 3 is provided between the input shaft 10 and a main shaft 17. The main shaft 17 is cylindrical and is disposed coaxially with the input shaft 10. The selector device 3 comprises a drive gear 18 secured to input shaft 10, reverse driven gear 19 rotatably mounted on the main shaft 17, and a synchronizer 22 mounted on the main shaft 17. The drive gear 18 meshes with one of gears of a counter gear assembly 20. Another gear of the counter gear assembly 20 engages with an idler gear 21, which in turn engages with the driven gear 19.

The synchronizer 22 has a well known mechanism and comprises a hub secured to the main shaft 17, and a synchronizer sleeve slidably engaged to the hub with splines. The synchronizer sleeve is adapted to engage with splines of the drive gear 18 or with splines of driven gear 19.

At a neutral position (N range) of a selector lever (not shown), the synchronizer 22 does not engage either gear, so that the main shaft 17 is disconnected from the input shaft 10. When the synchronizer is engaged with the gear 18, the input shaft 10 is connected to the main shaft 17 through the synchronizer to provide a driving range (D range).

When the synchronizer is engaged with the reverse driven gear 19, the input shaft 10 is connected to the main shaft 17 through gears 18, 20, 21 and 19 to provide a reverse driving range (R range).

The main shaft 17 has an axial passage in which an oil pump driving shaft 36 connected to crankshaft 10 is mounted. An output shaft 23 is provided in parallel with the main shaft 17. A drive pulley 24 and a driven pulley 25 are mounted on shafts 17 and 23 respectively. A fixed conical disc 24b of the drive pulley 24 is integral with main shaft 17 and an axially movable conical disc 24a is axially slidably mounted on the main shaft 17. The movable conical disc 24a also slides in a cylinder 27a formed on the main shaft 17 to provide a servo device 27. A chamber 27b of the servo device 27 communicates with an oil pump 37 through a passage 39 and the hydraulic control circuit 6. The oil pump 37 is driven by the shaft 36.

A fixed conical disc 25b of the driven pulley 25 is formed on the output shaft 23 opposite the movable disc 24a and an axially movable conical disc 25a is slidably mounted on the shaft 23 opposite disc 24b. Movable conical disc 25a has a piston portion with which a cylindrical portion 28a of the output shaft 23 is slidably engaged to form a servo device 28. A chamber 28b of the servo device 28 is communicated with the oil pump 37 through a passage 40 and control circuit 6. A drive belt 26 engages with the drive pulley 24 and the driven pulley 25.

Secured to the output shaft 23 is a drive gear 29 which engages with an intermediate reduction gear 29a on an intermediate shaft 30. An intermediate gear 31 on the shaft 30 engages with a final gear 32. Rotation of the final gear 32 is transmitted to axles 34 and 35 of rear driving wheels as main driving wheels through a differential 33.

The control circuit 6 is responsive to engine speed and throttle valve position for controlling the pressurized oil supply to servo devices 27 and 28 thereby moving discs 24a and 25a. Thus, transmission ratio is infinitely changed.

Figure 2:
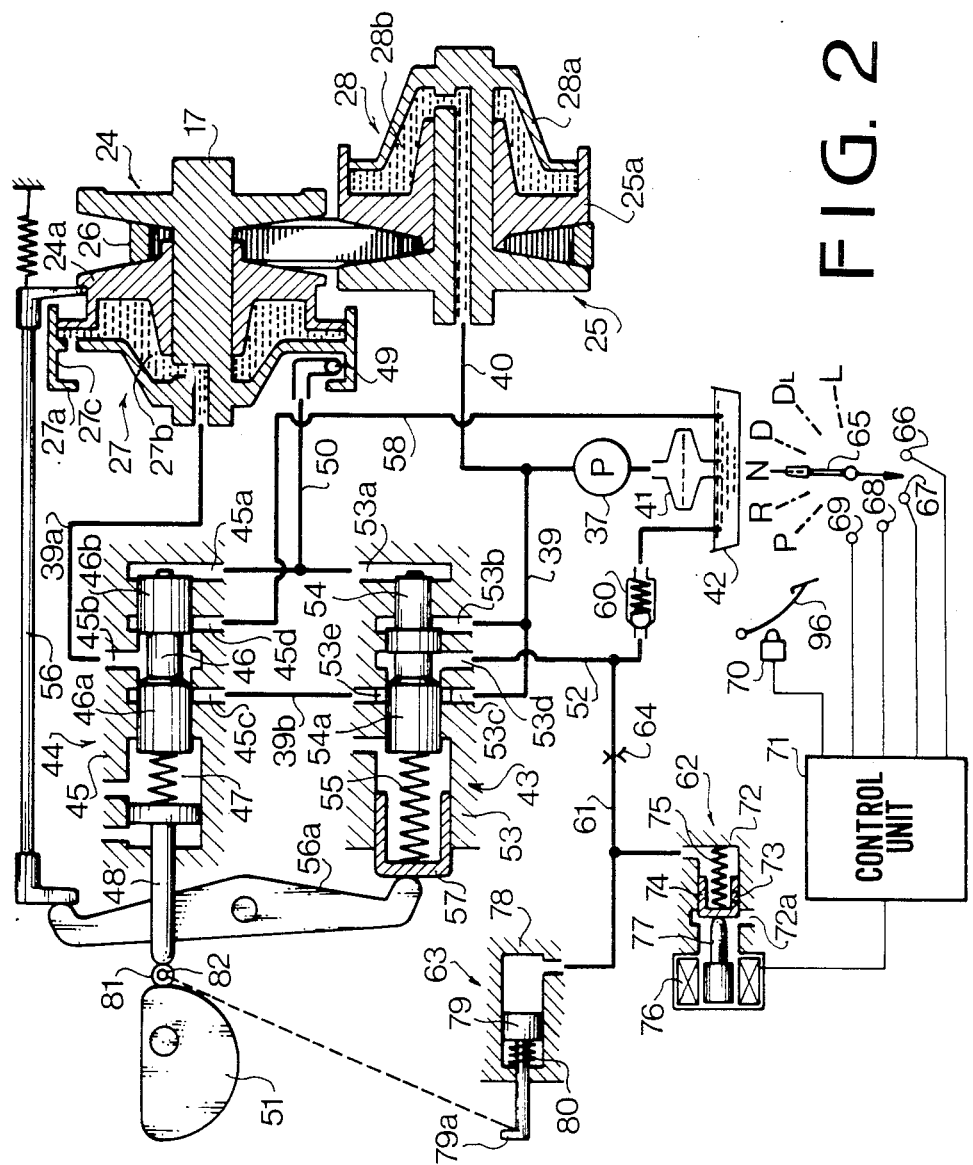
FIG. 2 is a schematic diagram showing a control system according to the present invention.

Referring to FIG. 2, chamber 27b of servo device 27 is applied with pressurized oil passing through conduit 39, pressure regulator valve 43 and transmission ratio control valve 44 by the oil pump 37 from an oil reservoir 42 through a filter 41. The chamber 28b of servo device 28 is applied with pressurized oil through conduit 40 without passing through valves 43 and 44. The movable conical disc 24a is so designed that pressure receiving area thereof is larger than that of movable conical disc 25a.

The transmission ratio control valve 44 comprises a valve body 45, spool 46, spring 47 for urging the spool in the downshift direction, an actuating member 48 engages a shift cam 51 through a roller 81. The shift cam 51 is operatively connected to an accelerator pedal of the vehicle so as to be rotated in dependence on the magnitude of depression of the pedal. A port 45b of the valve 44 is selectively communicated with a pressure oil supply port 45c or a drain port 45d in accordance with the position of lands 46a and 46b of spool 46. The port 45b communicates with chamber 27b through a conduit 39a, and port 45c communicates with pressure regulator valve 43 through a conduit 39b. The drain port 45d communicates with the oil reservoir 42 through conduit 58. The drive pulley cylinder 27a has an annular inside groove 27c in which a rotary speed sensor 49 in the form of a pitot tube is provided for measuring the speed of the oil in the groove that is the speed of the main shaft 17 which varies dependent on the engine speed. The pitot pressure produced by the rotary speed sensor 49 as a pitot tube is applied to an end chamber 45a of the valve 44 through a passage 50.

Thus, the spool 46 is shifted in dependence on the pitot pressure dependent on the engine speed and on the pressure by the spring 47 dependent on the opening degree of the throttle valve operatively connected to the accelerator pedal. More particularly, when the pitot pressure rises with increase of engine speed, the spool 46 is shifted to the left against the force of the spring 47 to communicate the port 45c with the port 45b. Accordingly, line pressure is applied the chamber 27b to move the movable disc 24a to the right, so that the upshift of the transmission starts. The force of the spring 47 increases with increase of the opening degree of the throttle valve and hence the starting point of the upshift moves to the higher engine speed zone.

The pressure regulator valve 43 comprises a valve body 53, spool 54, and a spring 55 for urging the spool 54 in one direction. The spool 54 is applied with oil pressure supplied through conduit 39 and a port 53b, so that the spool 54 is moved to the left by the oil pressure at the port 53b. One end of spring 55 engages with a slidable spring retainer 57 which is moved through an arm 56a and a sensor rod 56. The sensor rod 56 engages the disc 24a for detecting transmission ratio during operation. A port 53c connected with conduit 39 is communicated with a conduit 39b through an annular groove 53e and selectively communicated with a port 53d in accordance with the position of a land 54a.

The chamber 53a is applied with the pitot pressure from the sensor 49 passing through passage 50. Accordingly, the spool 54 is applied with the pitot pressure, with the pressure applied to the port 53b, and with the pressure of the spring 55 dependent on the transmission ratio. When the engine speed increases, the rod 56 moves to the right to turn the arm 56a in the clockwise direction. Thus, the spool 54a is shifted to the left to communicate port 53c with drain port 53d. Accordingly, the line pressure decreases, thereby performing the upshift operation of the transmission.

Thus, at high transmission ratio at which transmission torque is large, line pressure is increased by large force of the spring 55. As the transmission ratio decreases, the line pressure decreases to keep the engagement between the belt 26 and pulleys 24,25 so as not to cause the slip of the belt.

In the system of the present invention, a ball-check valve 60 is provided in a drain conduit 52, from which, at upstream of the valve 60, a passage 61 having an orifice 64 is branched off. The passage 61 is in communication with a solenoid operated valve 62 for generating operating pressure, and with an L-range actuator 63 for forcibly operating the transmission ratio control valve 44 according to the operating pressure. A shift lever 65 for selecting the operating ranges has six positions, i.e. P, R, N, D, D/L, and L-ranges and is provided to operate switches 66, 67, 68 and 69 which are turned on when either of R, D, D/L and L-range is selected. An accelerator switch 70 is provided to be turned on when an accelerator pedal 96 is depressed. Those switches 66 to 70 are connected to a control unit 71 for operating the solenoid operated valve 62.

Figure 3:
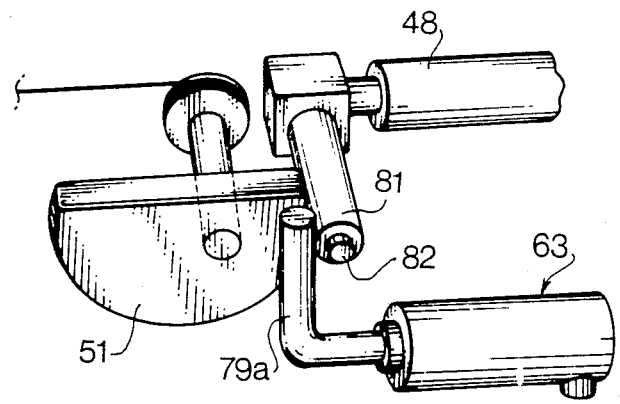
FIG. 3 a perspective view showing a part of a control device.

The solenoid operated valve 62 comprises a valve body 72 having a drain port 72a, a spool 74 having an opening 73, a return spring 75, a coil 76, and a plunger 77 for shifting the spool 74 as the coil 76 is energized. When the coil 76 is de-energized, the opening 73 comes into communication with the drain prot 72a, so that oil is discharged therethrough. The actuator 63 comprises a cylinder 78, a piston 79, and a return spring 80. A hook 79a formed at the end of the piston rod of the piston 79 is engaged with or released from a shaft 82 of the roller 81 (FIG. 3) which is provided between actuating member 48 of the transmission ratio control valve 44 and shift cam 51.

Figure 4:
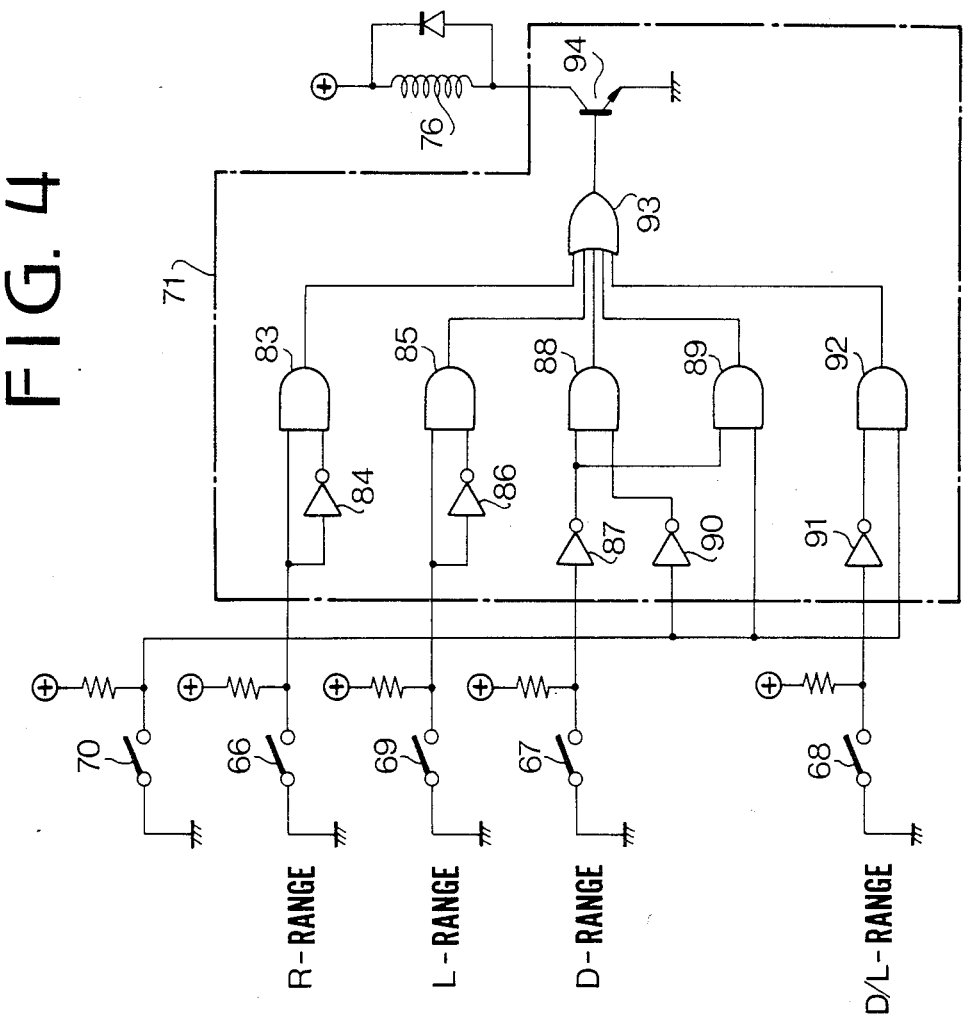
FIG. 4 shows an electronic control circuit in the control system.

The construction of the control unit 71 is explained hereinafter with reference to FIG. 4. When each of switches 66-70 is OFF, a high level signal is applied to the control circuit 71. The R-range switch 66 is connected to an AND gate 83 directly and indirectly through an inverter 84, so that the AND gate 83 keeps producing a low level signal, whether the switch 66 is ON or OFF. Similarly, the L-range switch 69 is connected to an AND gate 85 directly and indirectly through an inverter 86. The D-range switch 67 is connected to AND gates 88 and 89 through an inverter 87. The other input of the AND gate 88 is connected to the accelerator switch 70 through an inverter 90. Inputs of AND gates 89, 92 are connected to the accelerator switch 70 directly. At the D-range, either of AND gates 88 and 89 produce high level signals, whether the accelerator pedal is depressed or released. Further D/L-range switch 68 is connected to an AND gate 92 through an inverter 91 and the other input of the AND gate 92 is connected to the accelerator switch 70. Accordingly, at the D/L-range, AND gate 92 produces a low level or high level signal, dependent on whether the accelerator pedal is depressed or not. Outputs of AND gates 83, 85, 88, 89 and 92 are applied to an OR gate 93, which in return sends its output to a base of a transistor 94. The transistor 94 is connected to the coil 76 of the solenoid operated valve 62 so as to control a current passing through the coil 76. The following table shows the relationship between the selected range, conditions of the accelerator switch 70 and the energization of the solenoid valve 62.

TABLE

| Range | Accelerator Switch | Solenoid Operated Valve 62 |
|---|---|---|
| R | ON | de-energized |
|   | OFF |   |
| D | ON | energized |
|   | OFF |   |
| D/L | ON | de-energized |
|   | OFF | energized |
| L | ON | de-energized |
|   | OFF |   |

Figure 5:
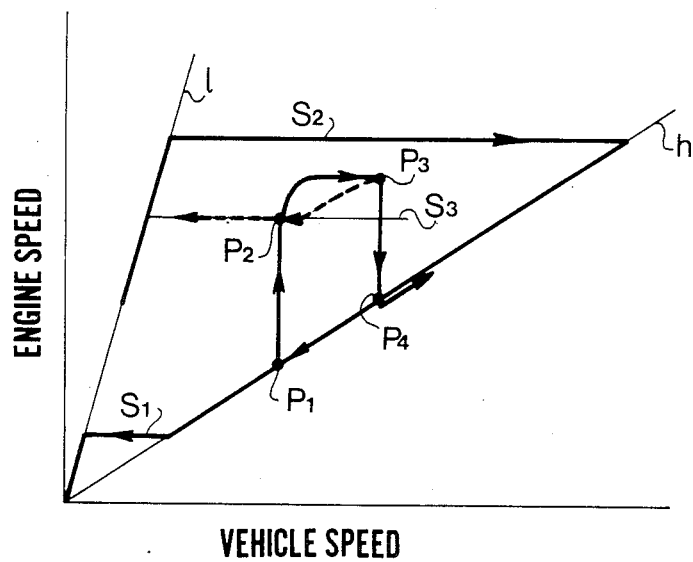
FIG. 5 is a graph showing the relationship between vehicle speed and engine speed.

The operation of the control system is described with reference to FIGS. 2 and 5. During forward driving at the D-range, the coil 76 of the solenoid operated valve 62 is energized, whether the accelerator pedal is depressed or not, so that the plunger 77 presses the spool 74 to the right. Accordingly the opening 73 is closed and operating oil pressure is built up in the passage 61. The operating oil pressure pushes the piston 79 in the actuator 63 to remove the hook 79a from the shaft 82 of the transmission ratio control valve 44. Thus, the transmission control ratio valve 44 operates dependent on the force of spring 47 which is actuated by the movement of the shift cam 51 and on the pitot pressure.

The line pressure, which is adjusted by the pressure regulator valve 43 in the oil pressure control system and is continuously introduced into the servo chamber 28b of the driven pulley 25, is further introduced into the servo chamber 27b of the drive pulley 24 by the transmission ratio control valve 44, as the pitot pressure rises with increase of the engine speed by the depression of the accelerator pedal. Thus, the running diameter of the belt wound on the drive pulley 24 is gradually increasing and the transmission is upshifted or downshifted between the highest ratio (low speed stage) 1 and the lowest ratio (high speed stage) h in FIG. 5. Such a shifting of the transmission ratio can be represented by the solid line in FIG. 5, wherein the line $S_1$ shows the transmission ratio during minimum opening degree of the throttle valve, the line $S_2$ shows the transmission ratio while the throttle valve is fully opened.

On the other hand, when the L-range is selected, the coil 76 of the solenoid valve 62 is de-energized regardless of the condition of the accelerator switch 70, so that the spring 75 presses the spool 74 to the left to communicate the opening 73 with the drain port 72a. Thus, the oil inside is discharged and the operating oil pressure applied on the actuator 63 is reduced. Therefore, the piston 79 of the actuator 63 is moved to the right by the force of the spring 80, so that the hook 79a engages with the shaft 82 to move the actuating member 48 of the transmission control valve 44 to the right to apply large spring force on the spool 46a regardless of the position of the shift cam 51. Thereby, the transmission ratio under the condition of minimum opening degree of the throttle valve changes from line $S_1$ to $S_3$ in FIG. 5, and in this case the transmission ratio changes in the range between $S_3$ and $S_2$. Accordingly, when the L-range is selected at point $P_1$, for example, transmission is downshifted to a point $P_2$ on the line $S_3$, and when the accelerator pedal is released at the point $P_2$, the transmission is further downshifted along the line $S_3$ as indicated by the broken line in FIG. 5 to effect the engine braking. On the contrary, when the accelerator pedal is depressed at $P_2$, the transmission is upshifted as indicated by the solid line to effect rapid acceleration. However, if the depressed accelerator pedal is released at the point $P_3$, the transmission is immediately downshifted as indicated by the broken line and the engine brake is effected.

Further when the D/L-range is selected and the accelerator pedal is depressed, the solenoid operated valve 62 is de-energized to have the transmission characteristics of the L-range described above, so that the transmission is downshifted from the point $P_1$ to the point $P_2$. Since the accelerator pedal is depressed, the transmission is upshifted to the point $P_3$ which is corresponding to the throttle valve opening degree. Then, when the accelerator pedal is released at the point $P_3$, the solenoid valve 62 is energized to change the L-range transmission characteristics to the D-range transmission characteristics automatically. Consequently, the force of spring 47 of the transmission ratio control valve 44 is reduced, so that the transmission ratio is controlled by the throttle cam 51. Then releasing of accelerator pedal causes the transmission to upshift immediately to the point $P_4$ of minimum transmission ratio. Thus, in this range, the transmission is automatically switched to have transmission characteristics of L-range or D-range, as the accelerator pedal is depressed or released.

When the R-range is selected the transmission becomes to have the same transmission range as the L-range. It is because of the fact that the rotary speed sensor 49 attached to the drive-pulley 24 does not produce pitot pressure at reversal rotation of the drive-pulley 24 in the R-range, thereby fixing the transmission ratio at the maximum value. In addition, malfunction caused by pitot pressure can be prevented.

The present invention is not limited to the embodiment explained above but includes embodiments in which, for example, the control unit 71 is composed by a microcomputer.

From the foregoings, it is understood that shift-pattern of the transmission includes the additional D/L-range in which the transmission characteristics of the D/L-range is automatically changed to the transmission characteristics of L-range as the accelerator pedal is depressed for acceleration so as to effect rapid acceleration with the L-range transmission characteristics, thus, the acceleration driveability is improved.

Moreover, since it is not necessary to select the L-range for rapid accelerating and then to shift back to the D-range any more, the operability is improved.

While the presently referred embodiment of the present invention has been shown and described, it is to be understood that this disclosure is for the purpose of illustration and that various changes and modifications may be made without departing from the spirit and scope of the invention as set forth in the appended claim.

What is claimed is:

1. An improved control system for an infinitely variable transmission for a vehicle powered by an internal combustion engine, the transmission having a shift lever for selecting operating ranges including a D/L range, an infinitely variable power transmitting device, a hydraulic circuit for operating the power transmission device, first detecting means for producing a first signal dependent on engine speed, a transmission ratio control valve provided in the hydraulic circuit and having a spool responsive to the first signal for controlling transmission ratio of the power transmitting device, wherein the improvement comprises:

first means for forcibly shifting the spool of the transmission ratio control valve in the downshift direction;

second detecting means responsive to operation of an accelerator pedal of the vehicle for producing a second signal;

a D/L-range switch for producing a third signal when the range is selected by the shift lever;

second means responsive to the second and third signal for operating the first means, the second means being arranged to operate the first means to move the spool in the downshift direction in response to the second signal at the depression of the accelerator pedal, and to move the spool in the upshift direction opposite to the downshift direction in response to the second signal at the release of the accelerator pedal.

2. The control system according to claim 1 wherein the infinitely variable power transmission device is a belt-drive device comprising a drive pulley having a hydraulically shiftable disc and a hydraulic cylinder for shifting the disc, a driven pulley having a hydraulically shiftable disc and a hydraulic cylinder for operating the disc, and a belt engaged with both pulleys, the hydraulic circuit has a pump for supplying oil, and the transmission ratio control valve is responsive to the first signal for controlling the oil and for shifting the disc of the drive pulley to change the transmission ratio.

3. The control system according to claim 2 wherein the first means comprising a solenoid operated valve provided in the hydraulic circuit so as to change the pressure of the oil, and an actuator responsive to the change of the pressure for shifting the spool, and the second means is a logic gate circuit for producing an output for energizing the coil of the solenoid operated valve.

* * * * *